United States Patent
Song et al.

(10) Patent No.: US 10,785,062 B2
(45) Date of Patent: Sep. 22, 2020

(54) METHOD AND APPARATUS FOR STATE FEEDBACK DECODER BASED CHANNEL ESTIMATION

(71) Applicant: KOREA NATIONAL UNIVERSITY OF TRANSPORTATION INDUSTRY-ACADEMIC COOPERATION FOUNDATION, Chungcheongbuk-do (KR)

(72) Inventors: Changick Song, Chungcheongbuk-do (KR); Seunghwan Baek, Chungcheongbuk-do (KR)

(73) Assignee: KOREA NATIONAL UNIVERSITY OF TRANSPORTATION, Chungcheonbuk-Do (KR)

(*) Notice: Subject to any disclaimer, the term of this patent is extended or adjusted under 35 U.S.C. 154(b) by 21 days.

(21) Appl. No.: 16/243,681

(22) Filed: Jan. 9, 2019

(65) Prior Publication Data
US 2019/0215194 A1    Jul. 11, 2019

(51) Int. Cl.
*H04L 25/02* (2006.01)
*H04L 5/00* (2006.01)
(Continued)

(52) U.S. Cl.
CPC ........ *H04L 25/0256* (2013.01); *H04L 5/0048* (2013.01); *H04L 27/22* (2013.01);
(Continued)

(58) Field of Classification Search
CPC . H04L 1/0009; H04L 1/0047; H04L 25/0256; H04L 27/22; H04L 27/2613;
(Continued)

(56) References Cited

U.S. PATENT DOCUMENTS 7,489,755 B2 *   2/2009   Wang ............... H04L 25/03159
                                              375/134
7,590,204 B2 *   9/2009   Monsen ........... H04L 25/03057
                                              375/350

(Continued)

*Primary Examiner* — Stephen J Clawson
(74) *Attorney, Agent, or Firm* — Porzio Bromberg & Newman P.C.

(57) ABSTRACT

The present disclosure relates to a state feedback decoder based channel estimating method including: calculating a first output bit when an input bit is 0 and a second output bit when an input bit is 1 using convolution encoder state information received from a determining unit; configuring a first virtual pilot and a second virtual pilot through modulation by receiving the first output bit and the second output bit; deinterleaving an i-th (here, i refers to a natural number corresponding to the number of OFDM symbols from 1) OFDM symbol; estimating a first channel and a second channel based on the first virtual pilot and the second virtual pilot using an output value in accordance with the deinterleaving result and calculating a first mean square error (MSE) and a second MSE; and comparing the calculated first MSE and second MSE to determine an input bit having a lower MSE as a reception bit by the determining unit and updating and feedbacking the convolution encoder state information using the determined reception bit.

9 Claims, 7 Drawing Sheets

(51) Int. Cl.
    *H04L 27/26*         (2006.01)
    *H04L 27/22*         (2006.01)
    *H04L 1/00*          (2006.01)

(52) U.S. Cl.
    CPC ........ *H04L 27/2613* (2013.01); *H04L 1/0009* (2013.01); *H04L 5/0007* (2013.01); *H04L 27/2647* (2013.01)

(58) Field of Classification Search
    CPC .. H04L 27/2647; H04L 5/0007; H04L 5/0048
    See application file for complete search history.

(56) References Cited

U.S. PATENT DOCUMENTS

| | | | | |
|---|---|---|---|---|
| 2012/0249888 | A1* | 10/2012 | Naik | H04B 1/0007 |
| | | | | 348/726 |
| 2012/0327991 | A1* | 12/2012 | Hrycak | H04L 25/0224 |
| | | | | 375/224 |
| 2017/0237508 | A1* | 8/2017 | Chang | H04B 17/21 |
| | | | | 375/350 |

\* cited by examiner

|  | Tap1 | Tap2 | Tap3 | Tap4 | Units |
|---|---|---|---|---|---|
| Power | 0 | -2 | -5 | -7 | dB |
| Delay | 0 | 200 | 433 | 700 | ns |
| Doppler | 0 | 2185 | -2185 | 2185 | Hz |
| Profile | Static | HalfBT | HalfBT | HalfBT |  |

METHOD AND APPARATUS FOR STATE FEEDBACK DECODER BASED CHANNEL ESTIMATION

CROSS-REFERENCE TO RELATED APPLICATIONS

This application claims the benefit under 35 U.S.C. 119(a) of Korean Patent Application No. 10-2018-0003311 filed on Jan. 10, 2018 in the Korean Intellectual Property Office, the entire disclosure of which is incorporated herein by reference for all purposes.

The present invention is the National research and development project performed by Hanbat University Industry-University Cooperation Foundation which is a supervision institution during Jan. 1, 2017 to Dec. 31, 2017, with respect to a research project of "development of the IoT network security technology in which cryptograph and a physical layer are coupled (creation seed—level 2)" related to the development and research project of the core original technology of information protection supported by the Institute for Information & Communications Technology Promotion of Ministry of Science and ICT.

BACKGROUND

Field

The present disclosure relates to a state feedback decoder based channel estimating method and a system using the same, and more particularly, to a state feedback decoder based a channel estimation method with a low complexity which is capable of improving a transmission performance when a signal is transmitted during a high speed movement of a wireless communication system IEEE 802.11p WAVE vehicle communication and an estimating system using the same.

Description of the Related Art

IEEE 802.11 is a technology used in a computer wireless network for a wireless local area network, commonly called a wireless LAN or WiFi, and also means a standard technology developed by a 11-th working group of LAN/MAN standards committee of IEEE (IEEE 802).

Even though terminologies of 802.11 and WiFi are alternately used, the Wi-Fi alliance defines the terminology of "WiFi" as a standard of another group. Therefore, 802.11 and WiFi are not synonymous.

IEEE 802.11p is an approved revision of IEEE 802.11 standard to which a wireless access in vehicular environments (WAVE) is added.

Recently, as studies on a next generation intelligent transport system have been actively conducted in accordance with the development of the vehicles and information communication, importance of vehicle to everything (V2X) which may improve the stability of drivers by configuring an inter-vehicle network has emerged.

V2X refers to a technology in which a vehicle communicates with various elements on the road for autonomous driving. The V2X is configured by vehicle to vehicle (V2V) communication which informs traffic situations ahead and approach between vehicles, vehicle to infrastructure (V2I) communication which communicates with traffic infrastructures such as traffic signals, and vehicle to pedestrian (V2P) communication which supports pedestrian information.

Data which is transmitted between vehicles in a highway environment of 100 km/h or higher should be reliable and in order to support such traffic safety services, IEEE 802.11p which defines a physical layer and a medium access control layer of WAVE communication is standardized.

An orthogonal frequency division multiplexing (OFDM) transmission scheme based on multi-carrier transmission has a structure in which signals are two-dimensionally disposed in a symbol axis and a subcarrier axis and pilots are also disposed according to the two-dimensional structure. Therefore, it is more advantageous than other systems to estimate channels having multipath fading characteristics. When the channel is estimated, the more the pilots, the higher the channel estimation performance. However, the number of data signals is relatively small, so that the number of pilots to be allocated is limited.

Currently, channel estimating techniques for estimating change in a time variable channel without changing IEEE 802.11p standard have been studied and as representative examples, a least square (LS) technique, a space-time averaging (STA) technique, a constructed data pilots (CDP) technique, and a time domain reliable test frequency domain interpolation (TRFI) technique are published as academic papers.

The existing 802.11p (WAVE) channel estimation schemes such as LS, STA, CDP, and TRFI have problems in that it is difficult to track the change of the channel caused by a Doppler frequency shift effect due to high speed movement of the vehicle and the inaccuracy of the channel estimation leads to the reduction in reliability of data restoration.

Further, an iterative channel estimating technique using a Viterbi decoder or an MAP decoder of the related art provides excellent performances as compared with the LS, the STA, and the CDP but a system delay may be caused due to complexity generated in an iterative channel estimating step operated by a decoder and a frame. Therefore, due to the system delay, it is difficult to apply the iterative channel estimating technique of the related art to an actual WAVE communication environment in which communication delay is directly connected to life.

SUMMARY

According to an aspect of the present disclosure, a state feedback decoder based channel estimating method includes: calculating a first output bit when an input bit is 0 and a second output bit when an input bit is 1 using convolution encoder state information received from a determining unit; configuring a first virtual pilot and a second virtual pilot through modulation by receiving the first output bit and the second output bit; deinterleaving an i-th (here, i refers to a natural number corresponding to the number of OFDM symbols from 1) OFDM symbol; estimating a first channel and a second channel based on the first virtual pilot and the second virtual pilot using an output value in accordance with the deinterleaving result and calculating a first mean square error (MSE) and a second MSE; and comparing the calculated first MSE and second MSE to determine an input bit having a lower MSE as a reception bit by the determining unit and updating and feedbacking the convolution encoder state information using the determined reception bit.

According to an exemplary embodiment of the present disclosure, in the configuring of the virtual pilots, as a modulation scheme, the BPSK modulation scheme may be used and a code rate may be 1/2.

Further, according to the present disclosure, as a channel estimating order, the modulation may be performed on a first subcarrier of an i-th OFDM symbol to a last subcarrier and then performed on an i+1-th OFDM symbol.

According to another aspect of the present disclosure, a state feedback decoder based channel estimating device includes: a convolution encoder which calculates an output bit in accordance with an input bit; a virtual pilot configuring unit which receives the output bit to configure a virtual pilot; a deinterleaver which deinterleaves an OFDM symbol; a channel and MSE estimating unit which receives outputs of the virtual pilot configuring unit and the deinterleaver to estimate a channel and calculate a mean square error (MSE); and a determining unit which determines an input bit having a smaller MSE as a reception bit using an output of the channel and MSE estimating unit.

The convolution encoder according to the present disclosure may set the input bit as 0 or 1 and calculate the output bits according to the case as a first output bit and a second output bit.

Further, the virtual pilot configuring unit may receive the first output bit and the second output bit to configure a first virtual pilot and a second virtual pilot through the BPSK modulation.

The channel and MSE estimating unit may estimate channels based on the first virtual pilot and the second virtual pilot using the deinterleaved result and calculate the first MSE and the second MSE.

The determining unit may compare the first MSE and the second MSE which are calculated to determine an input bit having a smaller MSE as a reception bit.

Further, the determining unit may further include a feedback unit which updates and feedbacks convolution encoder state information.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

In order to solve the above-described problem, an object of the present disclosure is to provide reliable communication even between vehicles which travel at a high speed by proposing state feedback decoder based channel estimation (SFDCE).

A more excellent performance than that of the channel estimation techniques LS, CDP, and TRFI with a low complexity proposed by the existing WAVE is provided and similar performance may be achieved with a low complexity as compared with the existing iterative channel estimating and decoding technique.

Hereinafter, embodiments of the present disclosure will be described with reference to the accompanying drawings. Parts which are required to understand an operation and an effect of the present disclosure will be mainly described in detail. In the description of the exemplary embodiment of the present disclosure, description of technical contents which are well known in the art and are not directly related to the present disclosure will be omitted. The reason is that unnecessary description is omitted to clearly transmit the gist of the present disclosure without obscuring the gist.

Further, in the description of components of an exemplary embodiment, a component having the same name may be denoted by a different reference numeral in some drawings but may be denoted by the same reference numeral even in different drawings. However, even in this case, it does not mean that the component has different functions depending on the exemplary embodiment or the components have the same function in the different exemplary embodiments but the function of each of the components may be determined based on the description of the components in the corresponding exemplary embodiment.

IEEE 802.11 is a technology used in a computer wireless network for a wireless local area network, commonly called a wireless LAN or WiFi, and also means a standard technology developed by an 11-th working group of LAN/MAN standards committee of IEEE (IEEE 802).

IEEE 802.11p is an approved revision of IEEE 802.11 standard to which a wireless access in vehicular environments (WAVE) is added.

Recently, as studies on a next generation intelligent transport system have been actively conducted in accordance with the development of the vehicles and information communication, importance of vehicle to everything (V2X) which may improve the stability of drivers by configuring an inter-vehicle network has emerged.

V2X refers to a technique in which a vehicle communicates with various elements on the road for autonomous driving. The V2X is configured by vehicle to vehicle (V2V) communication which informs traffic situations ahead and approach between vehicles, vehicle to infrastructure (V2I) communication which communicates with traffic infrastructures such as traffic signals, and vehicle to pedestrian (V2P) communication which supports pedestrian information.

Data which is transmitted between vehicles in a highway environment of 100 km/h or higher should be reliable and in order to support such traffic safety services, IEEE 802.11p which defines a physical layer and a medium access control layer of WAVE communication is standardized.

Specifically, 802.11p is a model obtained by modifying the existing WLAN (802.11a) and a direct short range communications (DSRC) standard to be appropriate for a vehicle environment and as a modulation scheme, orthogonal frequency division multiplexing (OFDM) having 64 subcarriers for every symbol is used.

The biggest difference between the WAVE and the existing WLAN is that the bandwidth is reduced from 20 MHz to 10 MHz to maintain compatibility with the existing vehicular ad-hoc network (VANET) technique. Further, in order to satisfy low latency requirements, the WAVE defines IEEE1609.3 to use a dual networking structure which selectively uses TCP/IP and a wave short message protocol (WSMP), thereby minimizing an authentication delay generated in the existing TCP/IP structure.

The IEEE 802.11p physical layer is formed based on orthogonal frequency division multiplexing (OFDM). The OFDM is a type of multi-carrier transmission techniques and is a concept of a modulation technique or a multiplexing technique in which high speed data streams input in series are loaded in a plurality of subcarriers to be simultaneously transmitted to low speed parallel channels. When the OFDM system is used, the frequency efficiency is improved and the multipath fading channel environment is mitigated.

Currently, channel estimating techniques for estimating change in a time variable channel without changing IEEE 802.11p standard have been studied and as representative examples, a least square (LS) technique, a space-time averaging (STA) technique, a constructed data pilots (CDP) technique, and a time domain reliable test frequency domain interpolation (TRFI) technique are published as academic papers.

The present disclosure relates to a state feedback decoder based channel estimating method and apparatus, and more particularly, to a complex channel estimating and data decoding technique which simultaneously satisfy high reliability and low delay characteristic in the WAVE.

Figure 1:
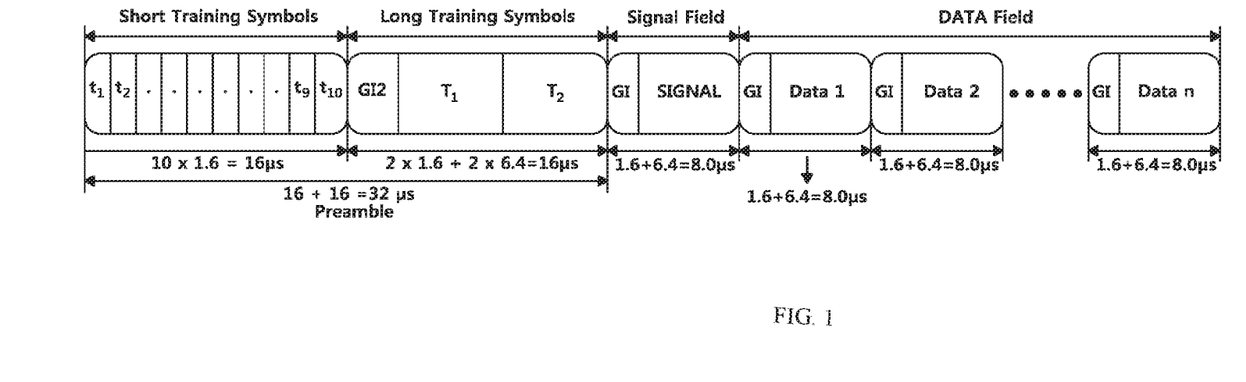
FIG. 1 is an IEEE 802.11p frame structure.

The technique proposed by the present disclosure is performed in the existing IEEE 802.11p frame structure as illustrated in FIG. 1.

The IEEE 802.11p packet is configured by a training signal field, a signal field which has information of a transmission signal, and a data field. The training signal is configured with 10 short training symbols and two long training symbols. Further, the data field is configured by a plurality of data symbols.

Figure 2:
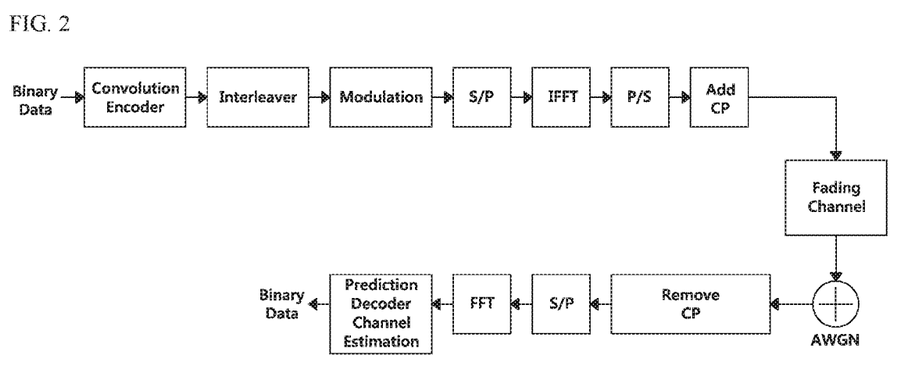
FIG. 2 is a system model of a state feedback decoder based channel estimating technique according to the present disclosure.

As illustrated in FIG. 2, a receiving end receives a data frame transmitted from a transmitting end to perform fast Fourier transform (FFT) and then immediately outputs a reception bit through the state feedback decoder based channel estimation according to the present disclosure without performing a separate demapping process.

In the channel estimation technique of the present disclosure, when it is assumed that the modulation method is a binary phase shift keying method and a code rate is 1/2, the channel estimation is performed for two subcarriers at one time. Further, it is assumed that a SFDCE receiver according to the present disclosure performs a convolution encoding process which is the same as a transmitting end several times.

The transmitting end may determine a code rate (1/2, 2/3, and 3/4) and a modulation level (BPSK, QPSK, 16 QAM, and 64 QAM) depending on a channel quality indicator (CQI) level and support a transmission bit rate up to 27 Mbps from 3 Mbps. In order to overcome a burst error of an error correction and wireless channel, a convolution encoder or a convolutional encoder and a bit interleaver is used and the receiving end uses a symbol deinterleaver and the SFDCE to decode signals.

The phase-shift keying is a modulation scheme which changes a phase of a carrier in accordance with a digital signal and transmits the carrier so that massive data is transmitted at a high speed. Phase-shift keying is classified into BPSK which transmits one bit by one phase signal and QPSK which transmits two bits in one phase signal. Here, according to BPSK, the phase is modulated for one bit by an NRZ level encoder and a product modulator, a structure of a transceiver is simple, and a transmission rate is low.

Figure 3:
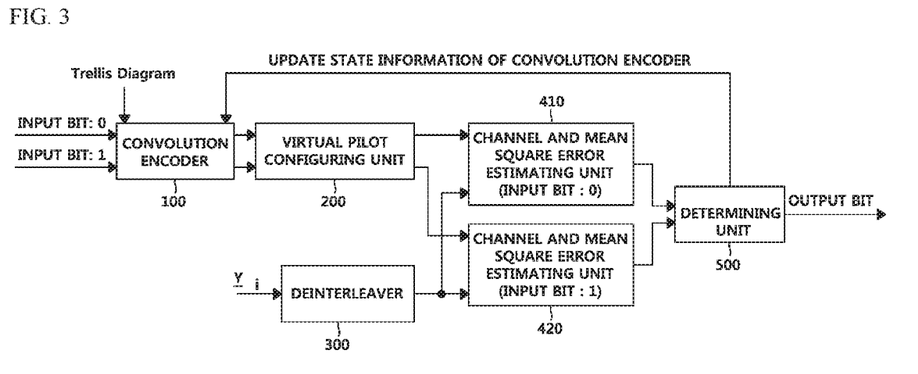
FIG. 3 is a block diagram of a device using a state feedback decoder based channel estimation (SFDCE) technique at a receiving end according to the present disclosure.
Figure 5:
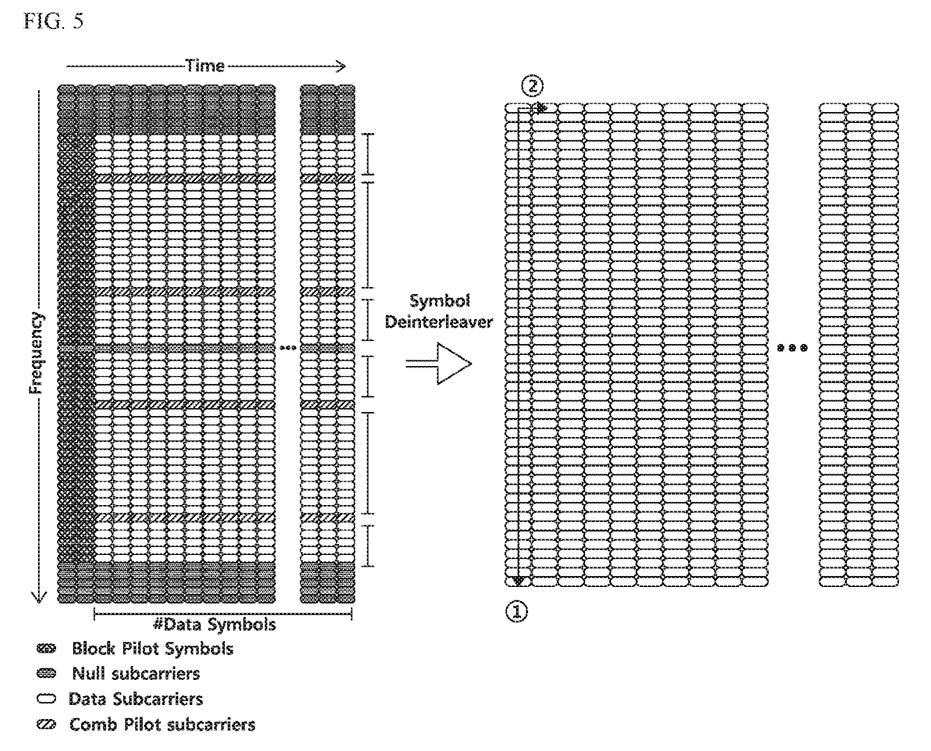
FIG. 5 is an IEEE 802.11p pilot structure and a proceeding order of an SFDCE technique.

FIG. 3 is a block diagram of a device using a state feedback decoder based channel estimating technique according to the present disclosure and FIG. 5 illustrates a channel estimating order in an IEEE 802.11p frame time frequency grid. The channel estimation is performed on a first subcarrier of an OFDM symbol to a last subcarrier and then is performed on a next OFDM symbol.

An operation principle in every step of the state feedback decoder based channel estimation (SFDCE) proposed by FIG. 3 will be described below in detail.

Figure 4:
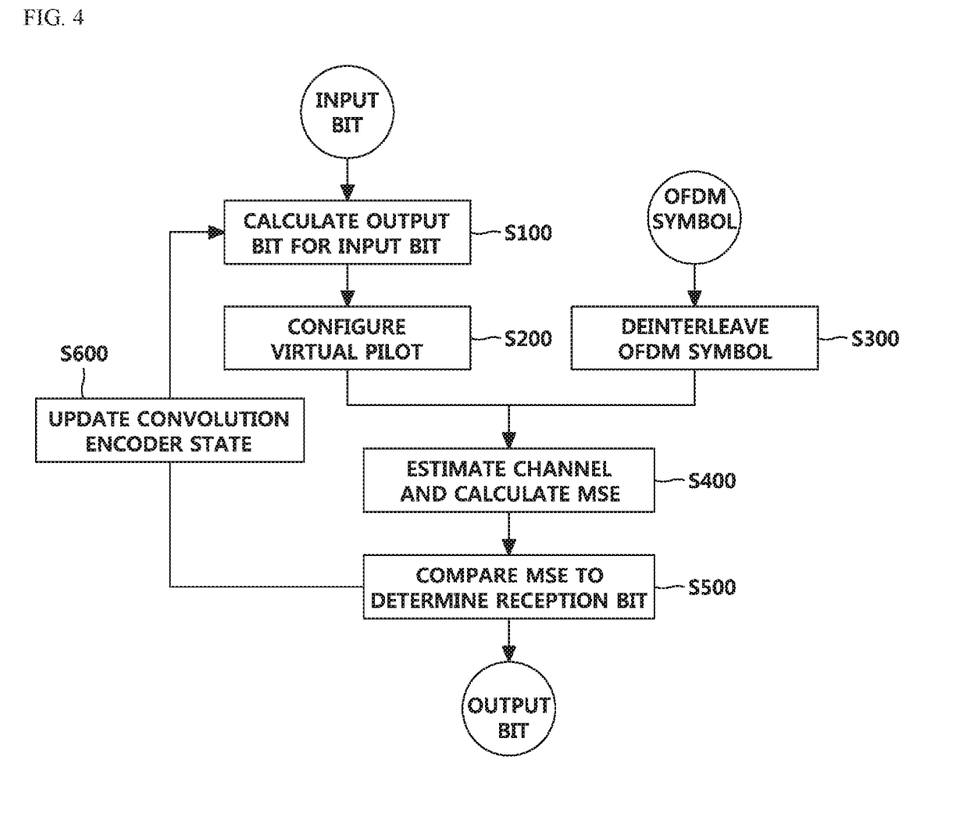
FIG. 4 is a flowchart of a state feedback decoder based channel estimating method according to the present disclosure.

FIG. 4 is a flowchart of a state feedback decoder based channel estimating method according to the present disclosure.

First, an initial state of a convolution encoder of an SFDCE receiver is set to be 0 in advance.

After receiving a feedback for state information of the convolution encoder from a determining unit of a pervious subcarrier channel estimating process, output bits {C01, C02} and {C11, C12} when input bits are 0 and 1 in a given state, respectively are calculated and then output in step S100.

As described above, an output bit when the input bit is 0 and an output bit when the input bit is 1 are individually calculated and an input bit having smaller MSE is determined as a reception bit so that more reliable channel estimation may be provided.

The output bit may be calculated using the input bit and the convolution encoder state information with reference to a Trellis diagram.

The calculated output bits {C01, C02} and {C11, C12} are input and virtual pilots when input bits are 0 and 1, respectively are configured by {X01, X02} and {X11, X12}, respectively, through the BPSK modulation in step S200.

According to an exemplary embodiment of the present disclosure, for the modulation method in a step of configuring the virtual pilots, the BPSK modulation method and a code rate of 1/2 are used. However, the modulation method and the code rate are not limited thereto, but other modulation methods or other code rate such as 1/4 may be used to estimate channel. However, in this case, the complexity may be correspondingly increased.

A received i-th (here, i refers to a natural number corresponding to a number of OFDM symbols from 1) OFDM symbol Yi is deinterleaved to obtain YDeinteri in step S300.

Here, "deinterleaving" means a process of changing a signal which is output to be rearranged by an interleaver to an original order.

The coded data is subjected to an interleaving process. In an intensive bit error such as fading may be generated in a wireless channel environment, but in this case, the error may not be satisfactorily compensated only by the convolution encoder. Therefore, such an intensive bit error may be randomly distributed using the interleaver. The interleaver rearranges the order of data streams in a predetermined unit. The data which is interleaved at an end of the receiver is rearranged in the original order by the deinterleaver. As a result, even though the bit in the middle of the data stream is lost due to an instantaneous noise, the influence is distributed to improve an error correction ability.

Virtual pilots {X01, X02} and {X11, X12} and YDeinteri obtained by deinterleaving the OFDM symbol are input and the channels when the input bits are 0 and 1, respectively are estimated to estimate {H01, H02} and {H11, H12}.

Thereafter, the estimated channels {H01, H02} and {H11, H12} are compared with a channel estimation result value of the previous OFDM symbol to calculate a mean square error (MSE) in step S400 and MSE0 when the input bit is 0 and MSE1 when the input bit is 1 are calculated, respectively.

The determining unit compares the calculated mean square errors MSE0 and MSE1 with each other and determines an input bit having a smaller MSE as a reception bit in step S500 and updates a state of the convolution encoder to feedback to the convolution encoder in a next subcarrier channel estimating process in step S600.

Next, the same process is repeated for next two subcarriers and the process ends at the last subcarrier of the frame.

The state feedback decoder based channel estimating device according to the present disclosure includes a convolution encoder 100 which calculates an output bit in accordance with an input bit, a virtual pilot configuring unit 200 which receives the output bit to configure the virtual pilot, a deinterleaver 300 which deinterleaves the OFDM symbol, channel and MSE estimating units 410 and 420 which receive the output of the virtual pilot configuring unit and the deinterleaver to estimate the channel and calculate a mean square error (MSE), and a determining unit 500 which determines an input bit which has smaller MSE as a reception bit using the output of the channel and MSE estimating unit.

The convolution encoder 100 according to the present disclosure sets the input bit as 0 or 1 and calculates the output bits according to the case as a first output bit and a second output bit.

According to the present disclosure, the decoding is performed using the convolution encoder 100, rather than using the Viterbi decoder or an MAP decoder at a receiving end.

Further, the virtual pilot configuring unit 200 receives the first output bit and the second output bit to configure a first virtual pilot and a second virtual pilot through the BPSK modulation.

The channel and MSE estimating units 410 and 420 estimate the channel based on the first virtual pilot and the second virtual pilot using the performed deinterleaving result and calculate the first MSE and the second MSE.

The determining unit 500 compares the first MSE and the second MSE which are calculated to determine an input bit having a smaller MSE as a reception bit.

Further, the determining unit 500 further includes a feedback unit which updates and feedbacks convolution encoder state information.

Figure 6:
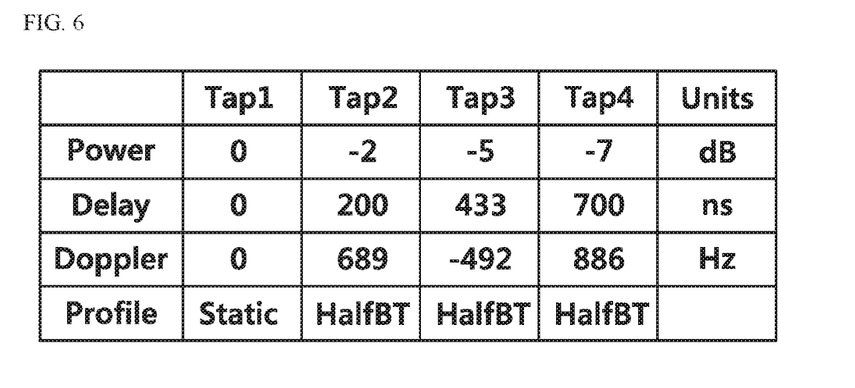
FIG. 6 is a simulation channel model mode 5.
Figure 7:
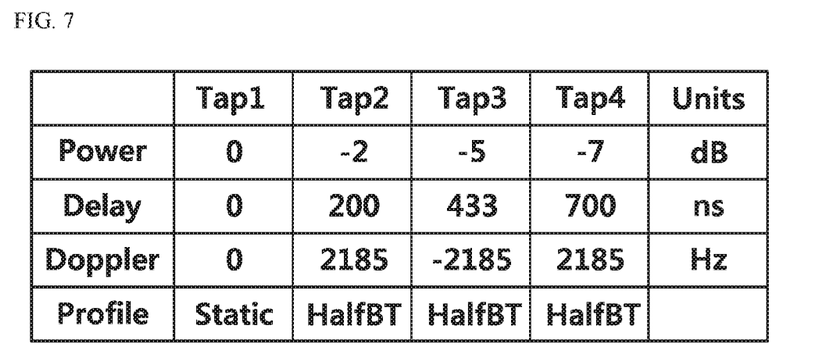
FIG. 7 is a simulation channel model mode 7.

FIGS. 6 and 7 illustrate a channel model used for a link level simulation according to the present disclosure. Here, Mode 5 and Mode 7 correspond to channel models at relative speeds of 252 km/h and 400 km/h in a highway Non-LoS environment, respectively.

Figure 8:
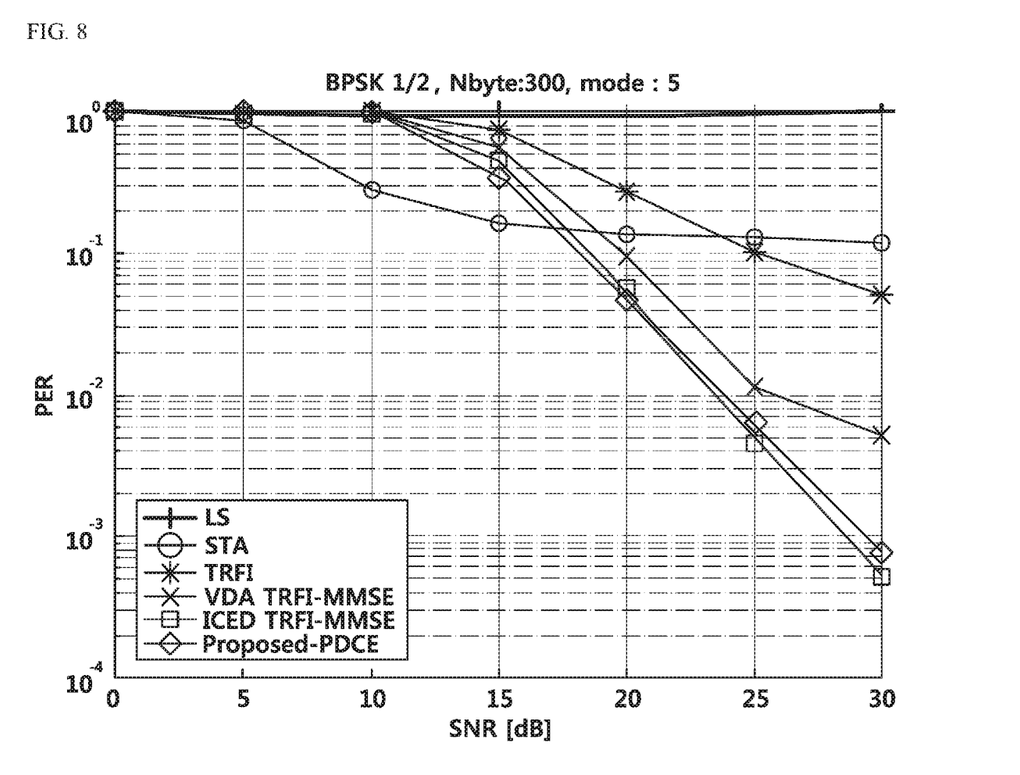
FIG. 8 is a simulation result mode 5.
Figure 9:
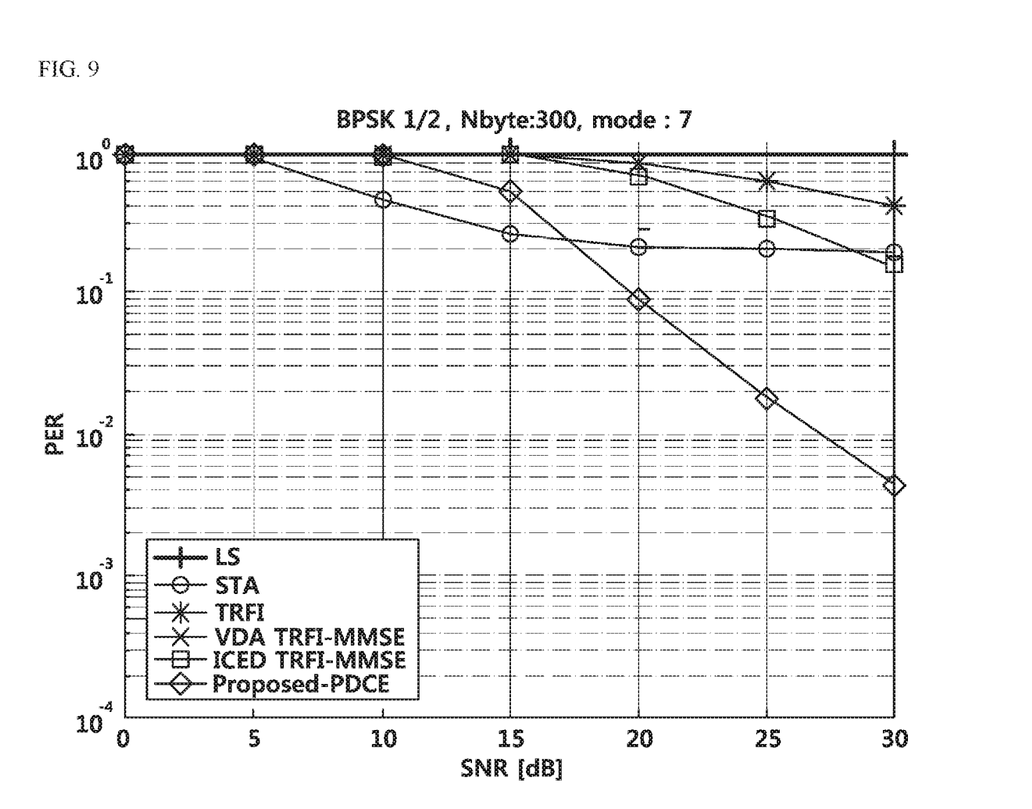
FIG. 9 is a simulation result mode 7.

As seen from FIGS. 8 and 9, in the channel estimating technique according to the present disclosure, Mode 5 satisfies 0.1% packet error rate (PER) at 30 dB of SNR and Mode 7 satisfies 1% PER at 30 dB of SNR.

Regardless of modes, as compared with the low complexity channel estimating techniques (LS, STA, and TRFI) of the related art, a transmission power gain of 20 dB or more may be achieved. Further, as compared with the high complexity Viterbi decoded aid channel estimation (VDA) and iterative channel estimation decoding (ICED) of the related art, in Mode 5, similar performance with a lower complexity may be provided and in Mode 7, a transmission power gain of approximately 20 dB may be achieved. Therefore, according to the technique of the present disclosure, the higher the movement speed of the vehicle, the larger the performance gain effect.

Figure 10:
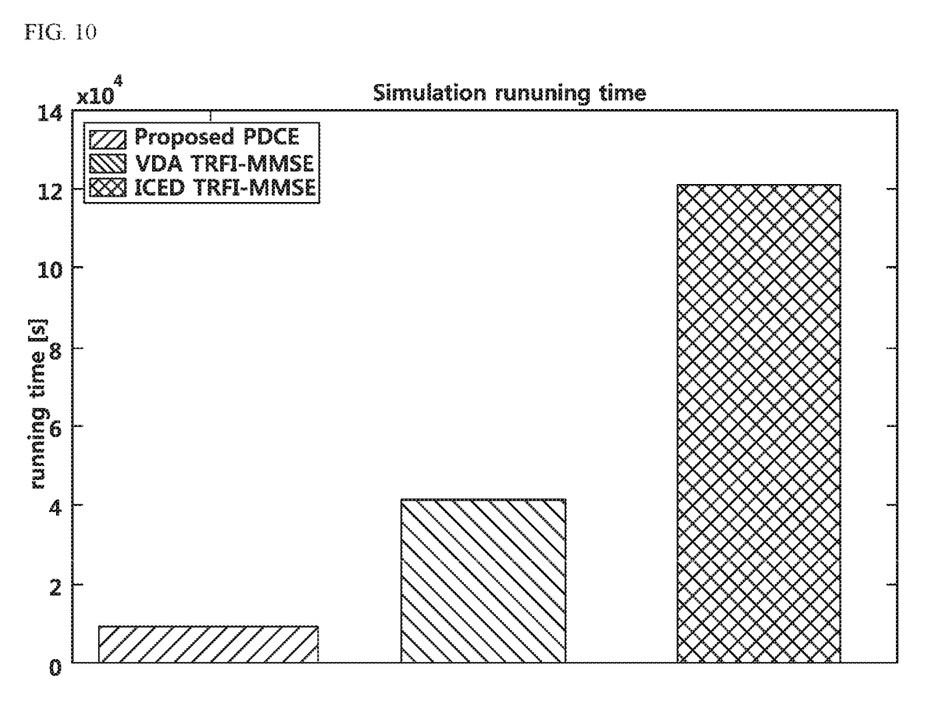
FIG. 10 is a graph for comparing running times of a channel estimating technique according to the present disclosure and a channel estimating technique of the related art.

FIG. 10 illustrates a result of measuring a CPU running time for analyzing complexities of VDA, ICED, and the SFDCE technique according to the present disclosure (Simulation environment: window 7 64 bits, i7-6700, 3.4 GHz, and 16 GB RAM). As a result of measurement, it is confirmed that even though the PDCE technique according to the present disclosure requires a significantly lower complexity than that of the VDA and ICED of the related art, more excellent performance may be provided.

The exemplary embodiments of the present disclosure which have been described above are examples and it is obvious to those skilled in the art that various changes or modifications may be made without departing from the spirit and scope of the present disclosure. Accordingly, the various exemplary embodiments disclosed herein are not intended to limit the technical spirit of the present disclosure but describe with the true scope and spirit being indicated by the following claims and the scope of the technical spirit of the present disclosure is not limited to the exemplary embodiments. The protection scope of the present disclosure should be interpreted based on the following appended claims and it should be appreciated that all technical spirits included within a range equivalent thereto are included in the protection scope of the present disclosure.

According to the present disclosure as described above, more excellent performance than the channel estimation techniques LS, CDP, and TRFI with a low complexity proposed by the WAVE of the related art may be provided and similar performance may be achieved with a low complexity as compared with the iterative channel estimating and decoding technique of the related art.

Further, in the channel estimation technique according to the present disclosure, the higher the movement speed of the vehicle, the higher the performance gain effect.

What is claimed is:

1. A state feedback decoder based channel estimating method, comprising:
    calculating a first output bit when an input bit is 0 and a second output bit when an input bit is 1 using convolution encoder state information received from a determining unit;
    configuring a first virtual pilot and a second virtual pilot through modulation by receiving the first output bit and the second output bit;
    deinterleaving an i-th (here, i refers to a natural number corresponding to the number of OFDM symbols from 1) OFDM symbol;
    estimating a first channel and a second channel based on the first virtual pilot and the second virtual pilot using an output value in accordance with the deinterleaving result and calculating a first mean square error (MSE) and a second MSE; and
    comparing the calculated first MSE and second MSE to determine an input bit having a lower MSE as a reception bit by the determining unit and updating and feedbacking the convolution encoder state information using the determined reception bit.

2. The state feedback decoder based channel estimating method according to claim 1, wherein in the configuring of virtual pilots, as a modulation scheme, a BPSK modulation scheme is used and a code rate is 1/2.

3. The state feedback decoder based channel estimating method according to claim 1, wherein as a channel estimating order, the modulation is performed on a first subcarrier of an i-th OFDM symbol to a last subcarrier and then performed on an i+1-th OFDM symbol.

4. A state feedback decoder based channel estimating device, comprising:
- a convolution encoder which calculates an output bit in accordance with an input bit;
- a virtual pilot configuring unit which receives the output bit to configure a virtual pilot;
- a deinterleaver which deinterleaves an OFDM symbol;
- a channel and MSE estimating unit which receives outputs of the virtual pilot configuring unit and the deinterleaver to estimate a channel and calculate a mean square error (MSE); and
- a determining unit which determines an input bit having a smaller MSE as a reception bit using an output of the channel and MSE estimating unit.

5. The state feedback decoder based channel estimating device according to claim 4, wherein the convolution encoder sets the input bit as 0 or 1 and calculates the output bit according to a case as a first output bit and a second output bit.

6. The state feedback decoder based channel estimating device according to claim 5, wherein the virtual pilot configuring unit receives the first output bit and the second output bit to configure a first virtual pilot and a second virtual pilot through the BPSK modulation.

7. The state feedback decoder based channel estimating device according to claim 6, wherein the channel and MSE estimating unit estimates channels based on the first virtual pilot and the second virtual pilot using the deinterleaved result and calculates a first MSE and a second MSE.

8. The state feedback decoder based channel estimating device according to claim 7, wherein the determining unit compares the first MSE and the second MSE calculated to determine an input bit having a smaller MSE as a reception bit.

9. The state feedback decoder based channel estimating device according to claim 8, wherein the determining unit further includes a feedback unit which updates and feedbacks convolution encoder state information.

\* \* \* \* \*